Nov. 6, 1934.  I. O. PEDERSEN ET AL  1,979,572
METHOD OF FORMING GLASS RECEPTACLES AND ARTICLE PRODUCED THEREBY
Filed May 28, 1931
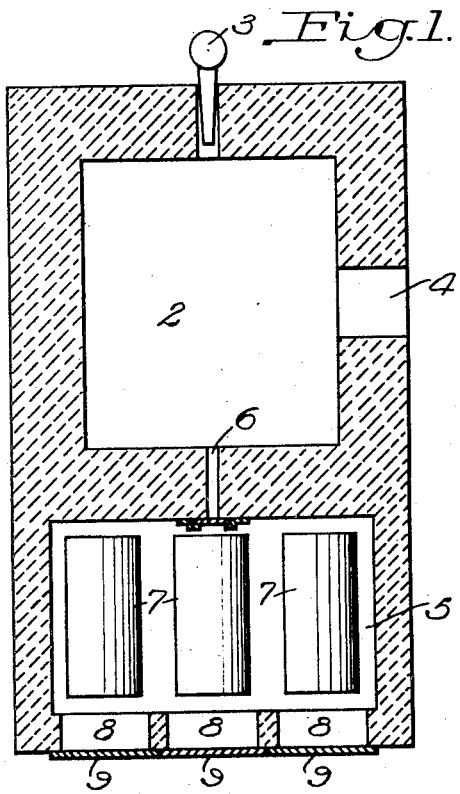
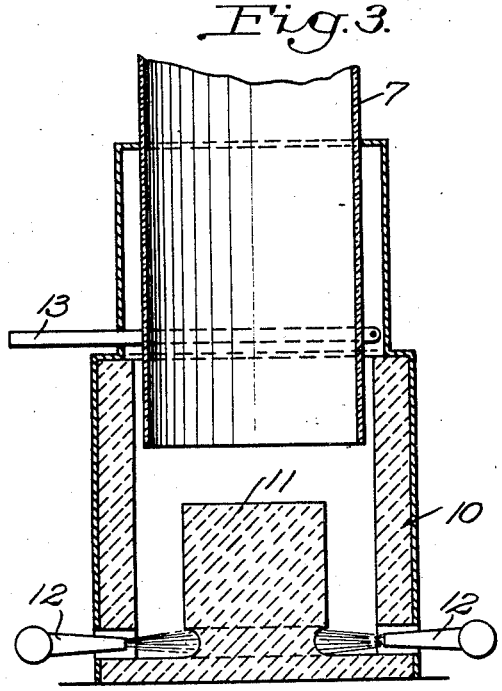
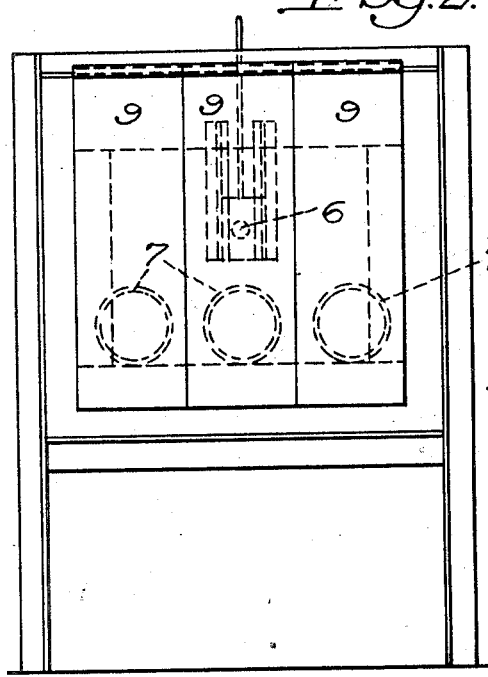
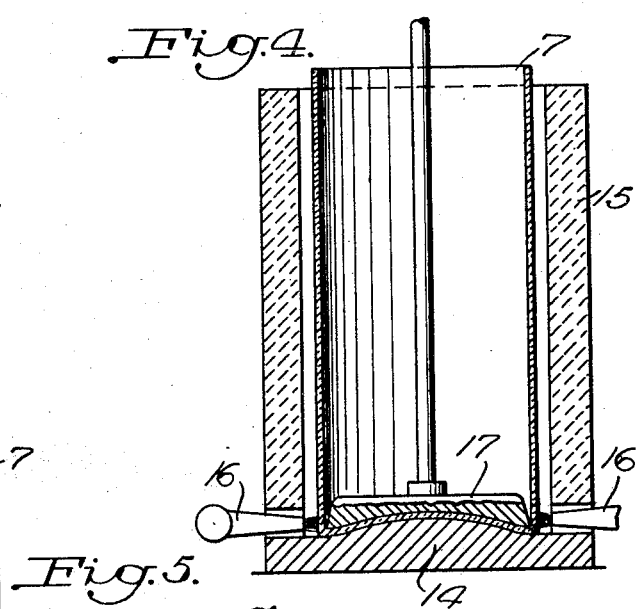
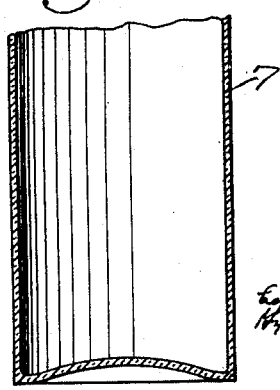
INVENTOR
Ingvald O. Pedersen
Erik G. Stahle
By Byrnes Stebbins Parmelee & Blenko
Their attys Patented Nov. 6, 1934

1,979,572

UNITED STATES PATENT OFFICE 1,979,572

METHOD OF FORMING GLASS RECEPTACLES
AND ARTICLE PRODUCED THEREBY

Ingvald O. Pedersen, Wilkinsburg, Pa., and Erik
G. Stahle, Lumberport, W. Va.

Application May 28, 1931, Serial No. 540,600

7 Claims. (Cl. 49—82)

Figure 1 is a horizontal section of a day tank for melting glass and preheating the cylinders formed.

Figure 2 is an end view of the furnace shown in Figure 1.

Figure 3 is a vertical section showing one form of glory hole furnace for raising the temperature of one end portion of a glass cylinder.

Figure 4 is a diagrammatic sectional side elevation showing the method of forming and welding the glass bottom to the cylinder.

Figure 5 is a partial vertical section of the final article.

Our invention relates to the manufacture of glass receptacles having glass sides and bottom, especially those of larger size. The object of the invention is to provide a cheap and simple method of welding and applying glass bottoms to glass cylinders.

The process is particularly adapted for using the cylinders formed by the Pedersen process set forth in the copending application of I. O. Pedersen, Ser. No. 366,787, although it may be applied to bottomless glass cylinders formed in any way.

In the drawing,

Figures 1 and 2 show a day tank 2, having heating means 3, a ladling hole 4, through which the glass is withdrawn, and a preheating compartment 5 to which the cylinders, severed from a drawn length and preferably having ground ends, are taken for warming up. 6 represents a valved passageway from above the glass bath in the day tank to the preheating chamber 5; 7 representing cylinders lying therein. These cylinders may be introduced through apertures 8 having adjustable closures 9. After thus warming up the cylinder to preferably about 300° F., one end of each cylinder is raised to near the welding temperature by a glory hole furnace.

Figure 3 shows one form of such furnace comprising an enclosure 10 having a base with central boss 11 and gas burners 12 projecting in through openings in the side walls. The glass cylinder 7 is shown as being gradually lowered toward the source of heat by suitable hand tongs or clamps 13.

Any desirable form of glory hole furnace may be used, the important feature being that an end portion of each cylinder is thus raised to a very much higher temperature than the remainder of the cylinder. This we have found to be important in the process. This reheated end is preferably brought to or above 1200° F. in this step.

After thus heating an end portion of each glass cylinder, the ground hot end of the cylinder 7 is then dropped down upon the bottom of a cast iron mold 14, which may have enclosing sides 15. Around the wall of this mold, just above its bottom, are provided heating burners 16, projecting thereinto. The ground hot end of the cylinder seats upon the mold bottom which closes its end. Molten glass is then fed into the interior of the cylinder and drops upon the mold bottom, being ladled in to a desirable amount. As soon as the molten glass is ladled in, a cast iron plunger 17 of the proper temperature below the sticking point, is forced down upon the glass within the cylinder to force it out into contact with the inside of the hot cylinder end portion. As shown, the mold bottom is of somewhat convex form, the end of the plunger being correspondingly concave, as this is found to aid in the after-annealing. The mold bottom and plunger may, however, be of any desirable shape.

As the molten glass is forced out against the side of the side walls of the cylinder, it welds with the hot cylinder glass and thus produces substantially a one-piece receptacle, a portion of which is shown in Figure 5. Such articles are then annealed in suitable annealing leers.

The glass bottoms may be formed to shape before the welding operation. The glass bottom may be welded to the end of the hollow article instead of to the inner portions of its end side walls and the mold made without side walls, although we prefer to force the glass against the inner side walls of the end portion.

The cross sectional shape of the hollow glass length may be square or of other polygonal shape, the means for carrying out the steps may be varied, and many other changes may be made without departing from our invention.

The advantages of our invention will be obvious to those skilled in the art, since a cheap and effective method is provided for making glass receptacles, especially those of larger size.

We claim:

1. In the manufacture of glass receptacles, the steps consisting of assembling a hollow glass article having an open end portion at a higher temperature than its remainder with said heated end portion in operative relation to a mold and feeding glass to said mold, and then applying pressure to the fed-in glass, spreading said glass to form a bottom and causing the spread edge portions of the fed-in glass to contact with the hot end of the article, and welding the same together.

2. In the manufacture of glass receptacles, the steps consisting of assembling a hollow glass article having an open end portion at a higher temperature than its remainder with said heated end portion in operative relation to a mold and feeding glass to said mold within the perimeter lines of the hollow glass article, and then applying pressure to the fed-in glass, spreading said glass to form a bottom and causing the spread edge portions of the fed-in glass to contact with the hot end of the article, and welding the same together.

3. In the manufacture of glass receptacles, the steps consisting of heating an open end portion of a hollow glass article to a higher temperature than the remainder of the article, assembling the section with its hot end in operative relation to a mold and feeding glass to the mold, and then subjecting the molten glass in the mold to pressure, spreading said glass to form a bottom and bringing these spread edge portions into contact with the hot article end, and welding the same together.

4. In the manufacture of glass receptacles, the steps consisting of heating an end portion of a hollow drawn glass article, assembling the heated end in operative relation to a mold containing a mass of molten glass, and then applying pressure to the molten glass to form a glass bottom and force the edge portions of the spreading glass into contact with the hot end of the article to weld the same together.

5. In the manufacture of glass receptacles, the steps consisting of heating the open end of a hollow glass body, setting said hot end in a mold with said end substantially closing the sides of the mold and feeding a mass of glass into the mold, and then applying spreading pressure to said fed-in glass to force the same outwardly into contact with the inner sides of the hot end portion to form a bottom welded thereto.

6. In the manufacture of glass receptacles, the steps consisting of heating the end portion of an open end glass body, assembling said hot end in operative relation to a mold containing a mass of molten glass and then applying pressure to the molten glass mass to spread the same to form a bottom and weld its edge portions to the said hot end, and applying heat to said hot end during said welding operation.

7. In the manufacture of glass receptacles, the steps consisting of heating the severed and finished end portion of a hollow drawn glass section, assembling said hot end in operative relation to a mold and feeding a mass of molten glass to the mold, and then applying pressure to the molten glass in the mold and spreading it to form a bottom and force its edge portions into contact with the hot section end to weld the same togeher.

INGVALD O. PEDERSEN.
ERIK G. STAHLE.